Feb. 12, 1946. N. F. HAAS 2,394,684
REFRIGERATOR
Filed Aug. 26, 1944 2 Sheets-Sheet 1

INVENTOR.
NORMAN F. HAAS
BY
Morton S. Brockman

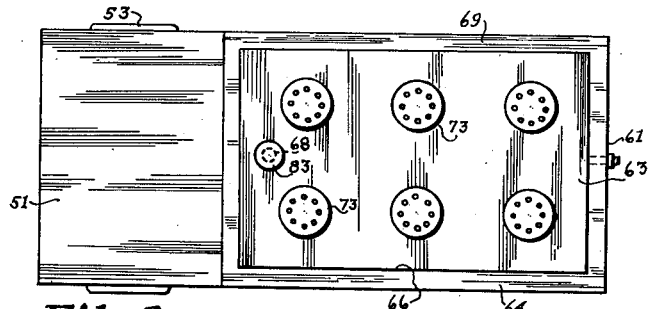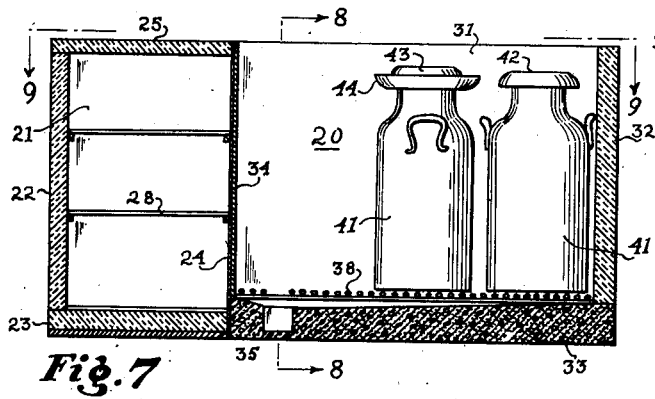

Patented Feb. 12, 1946

2,394,684

UNITED STATES PATENT OFFICE 2,394,684

REFRIGERATOR

Norman F. Haas, Orville, Ohio

Application August 26, 1944, Serial No. 551,352

5 Claims. (Cl. 62—101)

This invention relates to refrigerators, and particularly to an improved mechanical cooling apparatus used on dairy farms for cooling fresh milk.

Conducive to a clearer understanding of this invention, it may be well to point out that several states and municipalities have laws which require that milk be cooled to a temperature of fifty degrees Fahrenheit or lower within two hours after having been drawn from the cow. Also, aside from the law, dairymen generally realize the need for proper refrigeration in the production of milk. Temperature is the most important factor controlling the length of time that the milk will retain its sweetness, quality and palatability. The bacteria content of milk affects its fundamental qualities of healthfulness, food value, cleanliness, keeping qualities, taste and odor. At high temperatures, bacteria develop very rapidly and the milk loses its fine quality, it develops objectionable odors and quickly becomes sour. The U. S. Department of Agriculture recommends that the cooling of milk be started as quickly as possible after it is drawn and that its temperature be immediately reduced to below fifty degrees Fahrenheit. It has therefore become necessary for many dairy farmers to install milk cooling apparatus to accomplish this purpose as well as to comply with the existing laws. In order to properly cool the milk, it is necessary to remove a great amount of its heat within a relatively short period of time. In addition, there are many other factors which must be taken into consideration to satisfactorily and practically accomplish this. For example, matters of sanitation must always be carefully considered. The availability and the cost of water and electricity are also very important points in certain areas. The initial cost of the apparatus and the subsequent maintenance and repair costs are also prime factors to be considered.

Another important factor that must be considered by the dairy farmer is the flexibility of the unit; that is, whether its size is capable of handling different volumes of milk obtained during different seasons of the year. Due allowance and provision must also be made for receiving the fresh milk at least two times a day from the morning and evening milkings. Heretofore, when a night's milking was contained in the refrigerator and a morning's milking was then introduced therein, the newly introduced cans of milk tended to raise the temperature of the liquid cooling medium so that the temperature of the earlier milking was not maintained at a uniform temperature. Furthermore, the coolant in such tank would stratify and become warm at the top so that the newly introduced milk was not effectively cooled in the tops of the cans and the product of earlier milking tended to become sufficiently warm in the upper part of their respective cans to increase the bacterial count to a dangerous point and certainly to an objectionable degree.

Heretofore, the devices used for cooling milk on dairy farms have been of the immersion tank type. That is, the large ten-gallon cans of milk were either wholly submerged in a tank of cold water or were partly submerged and partly sprayed with cold water. In either event, the tanks used for immersing and cooling were of necessity of the type which opened at the top. They were never less than thirty inches high and since each ten-gallon can of fresh milk weighs about one hundred and fifteen pounds, considerable energy had to be expended several times a day to insert and to remove the cans. Obviously each of these cans had to be lifted over the side of the immersion tank and very often the cooling coils used for refrigerating the coolant or the liquid medium in the tanks were broken or injured by contact with these large, heavy containers.

Milk, when it is freshly drawn, has a temperature of a little above ninety degrees Fahrenheit, a temperature at which bacteria grow very rapidly, and since it must be reduced to a temperature below fifty degrees Fahrenheit within two hours, a relatively large amount of heat must be transferred or drawn from it rapidly and this treatment obviously requires a special type of cooling equipment.

It is therefore the primary object of this invention to provide a new, efficient and more rapid refrigerator for cooling milk in a plurality of large containers and which has side opening doors through which the dairyman may easily and quickly insert or remove the heavy, bulky containers.

Another object of this invention is to provide a refrigerator chill compartment which will conveniently, efficiently and practicably accommodate any number of standard size cans (either of five or ten gallon capacity) less than the maximum capacity of the compartment and so that either the addition or the removal of any one or more cans will not interfere with the cooling of or affect the condition of the previously inserted or remaining cans therein. Heretofore the practice has been to provide immersion tanks or coolers of specific capacities and to prescribe and sell a definite size cooler to the dairyman. It was therefore necessary to determine within fairly close limits the production capacity of the dairy herd, and to make allowance for the maximum production of milk obtainable at the flush season of the year. Also, the dairyman had to determine in advance the size of container he would use and he could not thereafter conveniently change. It should be noted here that milk cans are made in standard sizes of either five or ten gallon capacity and the prior art immersion tanks cannot efficiently accommodate or handle the two sizes at the same time.

The immersion type coolers are generally in two units: the cooling tank or cabinet and the refrigerating unit. These units have to be correctly proportioned and balanced with existing conditions. If a refrigerating unit is incorrectly proportioned, the assembled equipment will not efficiently and economically do the work for which it is designed. If the cabinet is not correctly designed, it will not hold the exact amount of refrigerating liquid required in proportion to the quantity of milk to be cooled. If different sized cans are used, the liquid would not be raised to the correct level. In either case, the temperature rise of the coolant liquid will be too great when the warm milk cans are placed in the cabinet to cool. If the temperature rise of the coolant is too great, it will tend to temporarily overload the mechanical parts of the refrigerating apparatus and thereby cause an unbalanced and expensive operating condition.

A further object of the invention is to provide a storage or chill compartment in a refrigerator of the type mentioned which may be quickly and easily washed and cleaned and made fully sanitary and which eliminates the necessity of milk cans standing in stagnant, old or dirty water. Also, the manner in which the coolant is used in this improved refrigerator prevents the formation of unsightly ring marks around the can, which rings are usually caused by the chemical reaction of the minerals in the water which reaches only a certain level around the can body.

Still another object is to construct a cooling device of the type mentioned which accomplishes the objects set forth and which may be temporarily disassembled for repair or replacement of parts without seriously interfering with or interrupting the daily operation or routine of the dairy. The instant invention is made in separable compartments so that if the upper coolant tank or the mechanical refrigerating mechanism is out of order, the tank may be quickly and easily removed from the bottom storage or chill compartment. The side doors of the storage or chill compartment can be closed and the compartment may then be used temporarily with water and ice as an immersion type cooler. The lid of the upper tank will also fit and serve as a cover for the lower temporary immersion tank.

These and other objects of the invention will become apparent from a reading of the following description and claims, together with the accompanying drawings, in which like parts are referred to and indicated by like reference characters, and wherein:

Figure 6 is an inverted or bottom view of the tank and the mechanical refrigerating unit cabinet, taken along the line and in the direction of the arrow 6—6 of the Figure 3;

Figure 7 is a longitudinal vertical cross-sectional view of the storage compartment, taken along the line and in the direction of the arrow 7—7 of the Figure 9;

Figure 8 is a lateral vertical cross-sectional view of the storage compartment, taken along the line and in the direction of the arrow 8—8 of the Figure 7;

Figure 9 is a plan view of the storage compartment of the refrigerator, taken substantially along the lines and in the direction of the arrow 9—9 of the Figures 7 and 8;

Figure 10 is a horizontal cross-sectional view of the storage compartment;

Figure 11 is a plan view of the auxiliary coolant-dispersing member; and

Figure 12 is a vertical cross-sectional view of the coolant-dispersing member shown in the Figure 11 and as it might appear mounted on a standard ten-gallon milk can.

Figure 1:
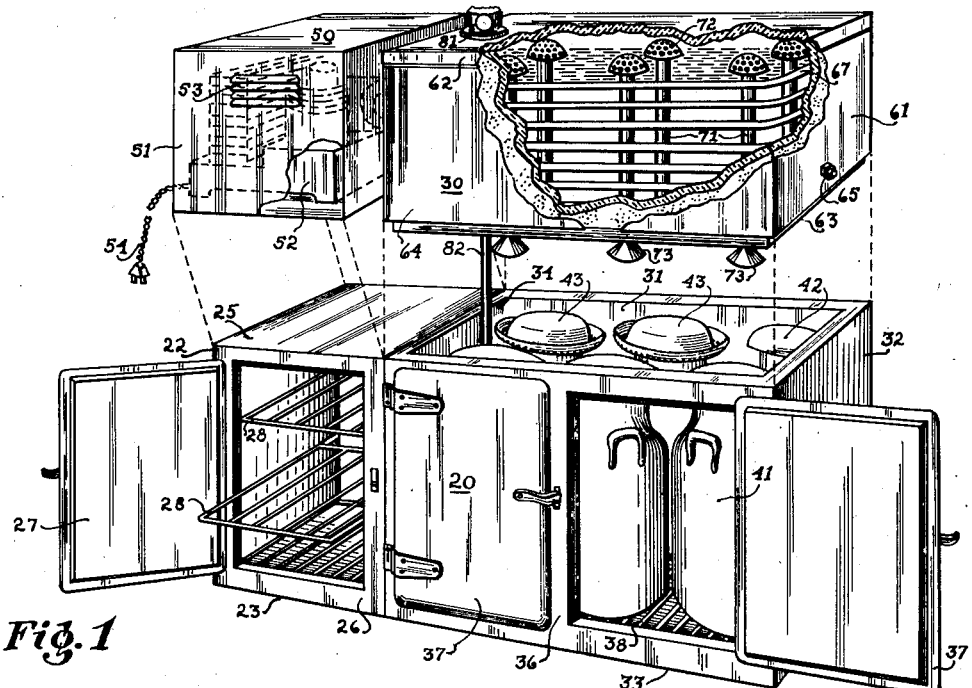
Figure 1 is a comprehensive view of the novel refrigerating unit, showing the storage compartment and the coolant tank and the mechanical refrigerating apparatus separated therefrom.

We accomplish this rapid means of heat transfer from one liquid to another by drenching almost all of the can containing the milk or the liquid to be cooled with a coolant or refrigerating medium which may be cold water, brine or any other suitable cooling liquid. A thin film of rapidly moving coolant is caused to evenly flow by gravity over the can. In order to accomplish the objects heretofore set forth, there is provided a refrigerating device which is composed of three separable units. There is first the storage compartment which contains the objects to be cooled. Second, there is the reservoir or tank containing the coolant or cooling medium; and third, the mechanical refrigerating apparatus for cooling the liquid medium in the tank. Each of these three elements are broadly indicated by the reference characters 20, 30 and 50 respectively and will be described in detail hereinafter.

The storage compartment is a fairly substantial insulated box-like cabinet 32 which may be divided as shown into a small dry compartment and a large chill or wet compartment. The chill compartment has an insulated rear wall 31, end walls 32 and a front wall 36. The front wall 36 is provided with side-opening doors 37. The floor of the cabinet 33 may be made of either asphalt, concrete or some other durable, waterproof mastic floor composition. The floor 33 of the chill compartment has a small sump chamber or trap 35 near one end thereof and the floor itself inclines so that the water or coolant entering the compartment will drain into the sump chamber 35 and be concentrated to be used over again. Almost immediately above the floor 33 there is, removably mounted, an open grill or grating 38 on which the milk cans 41 are placed. The grating 38 is made so that the liquid coolant will pass through and form a dry surface for the cans to stand on when the circulation of the coolant is stopped. The grating 38 need be only about six inches from the floor and the bottoms of the side door openings are about even with the level of the grating 38. The chill compartment walls 31, 32 and 36 should be well insulated and all the walls should be lined or coated with water-impervious material to prevent rust, quick deterioration and to encourage cleanliness. All of the side walls of the compartment should be about thirty-six inches high or just high enough to easily allow a covered ten-gallon milk can and the hereinafter described coolant disperser to be placed under the hereinafter described coolant conduit and sprinkler head.

To one side of the wet or chill compartment there is the dry compartment which may be used for the storage of other items. This dry compartment serves primarily as the base for the mechanical refrigerating apparatus 50, hereinafter described. It has a rear wall 21 and end walls 22 and a front wall 23. The front wall 23 is similarly provided with a side-opening door 27 and the compartment itself may be provided with shelves or grills 28 as shown in the Figures 1 and 7. Its outer walls, top 25 and bottom 23 may be insulated as desired. It is kept fairly cool by its close proximity to the chill cabinet and since its inner wall 24 is common with the inner wall 34 of the chill compartment.

The doors 37 in the front wall 36 are thoroughly insulated and provided with a sealing medium around their edges to make a water-tight closure. The doors also are provided with suitable durable hinges and locks so that in an emergency, the hereinafter described coolant tank may be removed and the closed wet compartment used temporarily as an immersion type cooler.

The chill compartment doors 37 are high enough to permit the easy and convenient insertion of an ordinary standard ten-gallon milk can which is approximately thirty inches high. This compartment also may be made in various sizes to accommodate any number of cans.

The second element of the refrigerator, namely the tank containing the refrigerant or cooling liquid, is a rectangular box-like structure which has front, rear and end walls 61. This cabinet is also suitably lined to retain the refrigerant and is suitably insulated to prevent the excessive absorption of outside heat.

The bottom 63 of the tank has recessed edges which fit inside the walls 31, 32, 34 and 36 of the storage compartment and normally is the cover for the storage compartment. The tank member 30 is held in place on the compartment member 20 by gravity and no permanent fastenings are needed, although they may be provided if desired.

Adjacent to the inside walls of the tank are suitable cooling coils 67 which are connected to the hereinafter described mechanical refrigerating apparatus 52. The two ends of the coil 67 pass through the inside end wall 66 of the tank, as shown in the Figures 2 and 3.

Extending through the bottom 63 of the tank are a set of conduits 71 which convey the coolant to the storage compartment 20 by gravity. The inlet or top open ends of the conduits 71 are provided with strainers 72 and are at a predetermined height which is the normal level of the coolant in the tank.

The outlet or bottom open end of the conduit which depends into the storage compartment is provided with the sprinkler head 73. This is slightly below the bottom 63 of the tank. Between the sprinkler head 73 and the floor 63 there is a simple manually operable valve which may be used to control the flow of the coolant through any one of the individual conduits and may be used to shut off the flow entirely if desired. If it is desired, for example, to remove a single can from the compartment without disturbing any of the others, the valve 74 immediately above the particular can to be removed may be closed, and the can may be allowed to drain off and dry for a few moments before final removal. In this way, the dairyman may handle a fairly dry can. In the winter months particularly it is inconvenient to have to handle a wet, dripping can.

The tank containing the coolant is also provided with a removable lid 62, on which there is mounted the hereinafter described pump 81. The pump member 81 for circulating the coolant between the lower compartment and the upper tank is a removable device of rather simple construction and is driven by a small electric motor. It is mounted on the top 62 of the tank immediately over the heretofore mentioned sump chamber 35 which is in the storage compartment 20. The lid 62 is provided with two holes through which the conduits 82 and 84 pass. The bottom of the tank has a close fitting hole 68, through which the suction conduit 82 passes. This conduit has at its lower end a small sieve or filter 83 which fits into the sump chamber 35, to prevent the passage of solids through the pump and into the coolant tank 30. The pressure conduit 84 of the pump member opens into the tank about half way between the bottom 63 and the lid 62. By simply removing the strainer 83 from the end of the suction conduit 82, the pump may be lifted up and easily dismounted from the lid 62.

A small thermostat 75 is mounted inside the tank which controls the operation of the mechanical refrigerating apparatus hereinafter described. This should be located in the tank about where the coolant is the warmest.

The tank or reservoir 30 containing the coolant is also provided with a small drain or outlet 65. This is simply a small threaded opening which is normally closed by the threaded cap. This opening 65 facilitates the drainage of the coolant for replacement and permits the quick and easy washing of the tank, the cleaning of the coils and the conduits.

Figure 2:
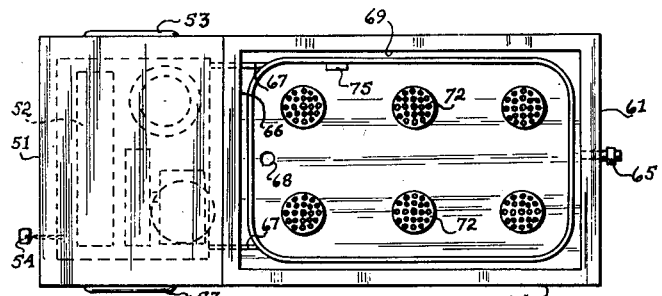
Figure 2 is a top plan view of the coolant tank or reservoir with the lid removed therefrom and a top plan view of the mechanical refrigerating apparatus unit.
Figure 4:
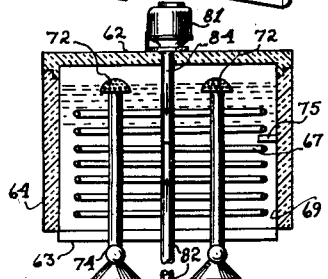
Figure 4 is a lateral vertical cross-sectional view of the coolant tank showing the pump, the conduits and refrigerating coil therein.
Figure 3:
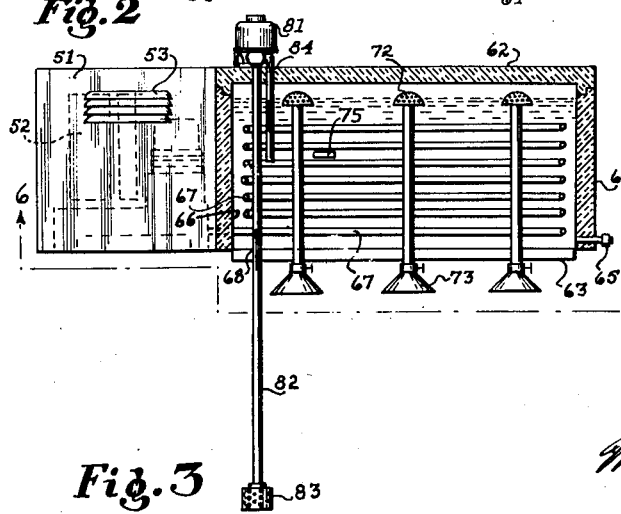
Figure 3 is a longitudinal vertical cross-sectional view of the tank and the side of the mechanical refrigerating member cabinet.
Figure 5:
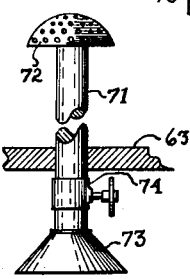
Figure 5 is an enlarged view of one of the coolant conduits in the tank.

The mechanical refrigerating apparatus, which is broadly indicated by the reference character 50, is a conventional unit of suitable size and capacity and may be purchased on the open market. No invention is claimed in this unit alone or apart from the hereinafter set forth combinations of parts. It is suitably mounted and placed in the cabinet 51 and rests on the top of the dry chamber of the lower cabinet. In the drawings, the motor and compressor units are indicated by the reference character 52. The cabinet 51 is provided with louvers 53 which permit a free circulation of air. The drawings also show the electric cord 54 for connecting the refrigerating unit 50 to the current supply. The Figures 2 and 3 show the two ends of the cooling coil 67 passing through the side walls 66 of the tank and connected to the compressor.

The coolant disburser, heretofore referred to, is an auxiliary device which is a hat-like member that fits over and rests on the top of an ordinary milk can. The Figures 7, 8 and 12 clearly show a milk can having one of these auxiliary coolant disbursers mounted thereon. The coolant disburser has a flat top portion 43 from which there depends an upwardly curved circular brim 44. The outer portion of the brim 44 has small evenly-spaced perforations 45 therein. The perforations are so placed and positioned that coolant sprinkled on the top 43 and in the curved brim 44 is caused to flow and drip evenly around the shoulder and sides of the milk can. They are positioned and spaced to prevent splashing of the coolant upward around the neck and lid of the can. It is not necessary, therefore, to carefully position the cans immediately under and centrally below the respective sprinkler heads 73. The cans may be roughly positioned since the flow of coolant around the cans will be governed more by the perforated brims 44 than by the position of the can on the grating 38. This hat-like member is simply laid on the top of the closed can and is not structurally fastened to it in any way. Since they have mean diameters greater than the cans themselves, two cans may be cooled by the refrigerant coming from one sprinkler head.

In the operation of this particular device, the coolant is brought to a level slightly above the top opening of the conduit 71. The coolant then overflows through the conduits, down over the cans 41 and drains into the sump chamber 35. The pump 81 then draws the used coolant back into the tank and discharges it into the lower part of the reservoir. The liquid is mixed with the other coolant in the tank, re-cooled and is used over again. A continuous circuit of coolant is thus maintained as long as the level of the liquid in the tank 30 is above the top openings of the conduit 71. Circulation of coolant ceases when the level of the liquid drops below the top openings. The thermostat 75 is pre-set and when it is affected by a lowering of the temperature of the coolant which returns from the sump chamber 35, the mechanical refrigerating apparatus 52 is automatically shut off. At such time the contents of the milk cans are below a certain predetermined temperature, and from then on the mechanical refrigerating unit operates intermittently and only when actually needed to keep the temperature of the milk below the predetermined degree. The motor for the pump 81 is also made to stop automatically by the operation of the thermostat and the sump chamber 35 is allowed to fill up and the level of the liquid in the reservoir is allowed to drop below the top openings in the conduit 71. Circulation of the coolant therefore ceases and when the temperature of the coolant indicated by the thermostat 75 rises again to a predetermined temperature, the apparatus again is automatically set in operation.

The lid 62 on which the pump 81 is mounted has the same general dimensions as the bottom of the tank 30 and is made to fit the top and side walls 31, 32 and 34 of the chill compartment. In case of emergency, if the tank or the mechanical refrigerating apparatus need repairs, for example, the doors 37 may be sealed, the coolant may be allowed to drain into the closed bottom compartment 30 through the opening 65. This is simply done by lifting the pump member 81 off of the lid 62 and withdrawing the suction conduit 82 through the hole 65.

Among the many advantages that this particular milk cooler has over prior art devices is the feature which permits the refrigerating apparatus to build up a reserve or a bank of ice in the tank which alone will keep the cooling medium at a sufficiently cool temperature, even though the mechanical refrigerating apparatus is temporarily disconnected or shut off. Heretofore, the cooling coils had to be placed close to the walls of the storage cabinet in order to provide sufficient room for the cans inside and not sufficient space was allowed for the formation or accumulation of amounts of ice large enough to be of real value. Since the upper cooling tank or reservoir of this invention does not receive the cans and since the coolant is relatively free from agitation, large pieces of ice may more easily form therein to provide a sufficient reserve for keeping the coolant at a suitable temperature. This eliminates the necessity of operating the mechanical apparatus for long periods of time. A relatively small cake of ice may be allowed to form or may be actually placed in the tank of coolant, during the off-peak load, which will be sufficient to maintain the temperature for a considerable time and still have a sufficient amount of unfrozen liquid in the tank for circulation through the apparatus.

Another advantage of this particular type of apparatus over prior art devices is that it causes the fresh or relatively colder liquid to be immediately dispersed over the top and shoulders of the can and first used where the cream is. Cream is slower to cool than milk because of its butter content. The thinner milk at the bottom of the can is sufficiently cooled by the slightly warmed coolant thereabout.

A further advantage of this refrigerator is that its cooling process is speeded considerably. The heat of the milk is transferred to the rapidly moving low temperature coolant by conduction rather than by the relatively slower convection process which is used in the immersion type tanks. Unless the coolant in the immersion tank is constantly agitated and stirred, the warm coolant tends to remain in the vicinity of the cans and therefore is less effective. Experiments and tests have shown that the temperature of fresh milk may be reduced with the herein described method and apparatus from a temperature of ninety degrees to below fifty degrees Fahrenheit in less than forty minutes.

This apparatus needs no special agitating mechanism and it has fewer complex or moving parts than comparable devices. It is therefore less likely to get out of order. It should also be noted that, if desired, one or more valves 74 may be entirely closed and a portion of the chill or wet compartment may be easily partitioned off to provide additional dry storage space.

Having thus disclosed the invention, it is to be understood that the embodiment thereof, as described and illustrated, is not to be considered in a limiting sense as there may be other forms, uses or modifications which may also be considered to come within the scope of the appended claims.

I claim:

1. A refrigerator, comprising in combination, a storage compartment, a tank containing a liquid coolant mounted on the compartment, conduits on the tank opening at their upper ends in the said coolant and opening at their lower ends into the compartment, the said conduits having means thereon for dispersing the coolant in the said storage compartment, and a means in the compartment for gathering the coolant and returning the same to the tank.

2. A refrigerator, comprising in combination, a storage compartment, a tank containing a liquid coolant mounted on the compartment, the said tank having automatic means for cooling the liquid coolant to and for retaining the same at a predetermined temperature, conduits on the tank opening at their upper ends in the said coolant and opening at their lower ends into the compartment, the said conduits having means thereon for dispersing the coolant in the said storage compartment, and a means in the compartment for gathering the coolant and returning the same to the tank.

3. A refrigerator, comprising in combination, a storage compartment, a tank containing a liquid coolant mounted on the compartment, a plurality of conduits mounted on the tank, each of the said conduits having an upper end opening into the coolant and a lower end opening into the said compartment for conveying the coolant by gravity thereto, and a means in the compartment for returning the coolant to the tank.

4. A refrigerator, comprising in combination, a storage compartment having a floor portion, an elevated grating above the floor portion and a sump chamber in the floor portion below the grating, the said compartment also having side doors therein opening at the level of the said grating, a tank containing a liquid coolant mounted on the compartment, a plurality of conduits mounted on the tank, each of the conduits having an inlet for receiving the coolant in the tank and an outlet for discharging the coolant in the compartment, the said conduits having means on the outlets for dispersing the coolant in the said storage compartment, and a means in the compartment for gathering the coolant and returning the same to the tank.

5. A refrigerator, comprising in combination, a storage compartment having a coolant sump chamber therein, a tank containing a liquid coolant mounted on the compartment, conduits mounted on the tank and opening into the compartment for conveying the coolant thereto by gravity, the said conduits having inlets proximate to the level of the coolant, and a pump member mounted on the tank connected to the sump chamber for returning the coolant to the said tank.

NORMAN F. HAAS.